May 12, 1970 — R. F. LANE — 3,510,912
MOLD ASSEMBLIES FOR SHOE SOLES
Filed July 19, 1968
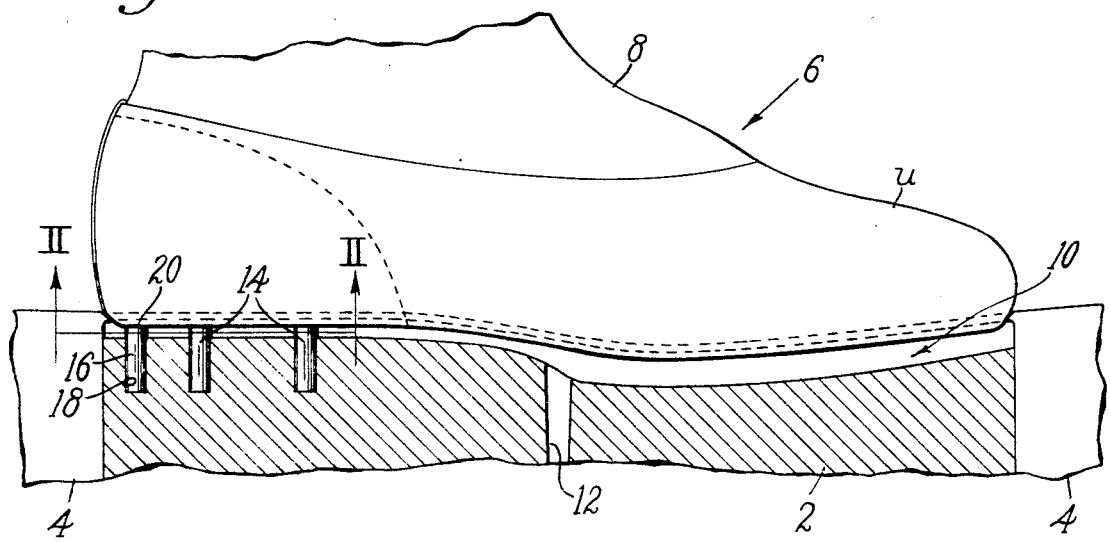
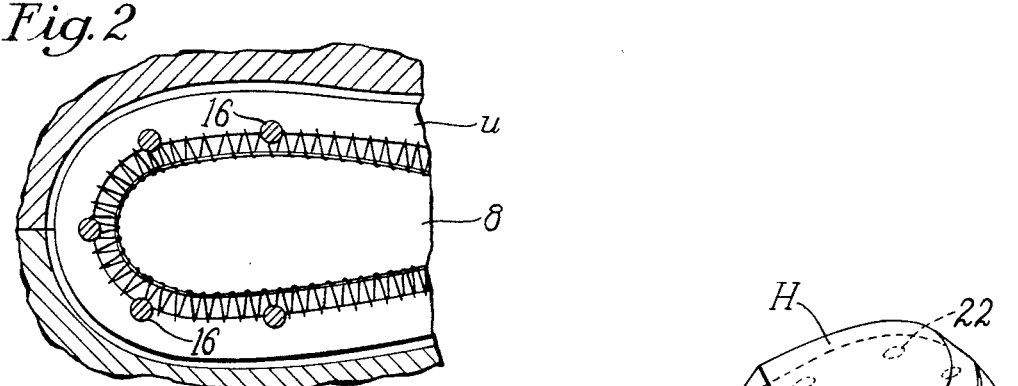
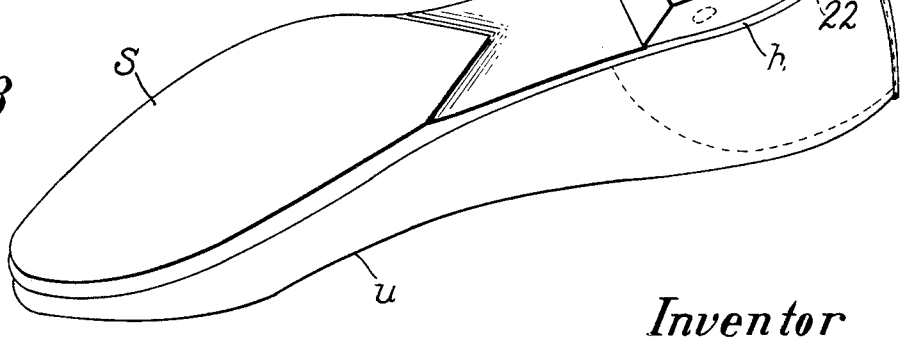
Inventor
Robert F. Lane
By his Attorney

United States Patent Office 3,510,912
Patented May 12, 1970

3,510,912
MOLD ASSEMBLIES FOR SHOE SOLES
Robert F. Lane, Danvers, Mass., assignor to USM Corporation, Flemington, N.J., a corporation of New Jersey
Filed July 19, 1968, Ser. No. 746,132
Int. Cl. B29c 1/00
U.S. Cl. 18—42                               4 Claims

ABSTRACT OF THE DISCLOSURE

Mold assembly for molding a sole onto a lasted upper, including upper engaging means disposed on the mold cavity surface of the bottom mold member and protruding therefrom to urge the upper close against the mold cavity surface of a footform on which the upper is mounted.

BACKGROUND OF THE INVENTION

Field of the invention

This invention relates to mold assemblies and is directed more particularly to a mold assembly for the injection molding of soles directly onto lasted footwear uppers.

DESCRIPTION OF THE PRIOR ART

The molding of sole and heel units onto lasted uppers is now commonplace in the shoe manufacturing industry. Such shoemaking method has realized significant economies and has been widely accepted. The molds used in injection molding soles are, however, quite expensive, incurring great costs when there is a substantial change in the style of the shoe.

The heel area of the footwear sole is an area frequently concerned with style changes. It often happens that a style change involves principally a change in height or shape of the heel. Modifying molds to accommodate various heel heights and other changes in heel design is prohibitively expensive. Accordingly, there has arisen a demand for a mold assembly for molding a heelless sole onto an upper. While it might appear that such could be accomplished by simply omitting the heel portion of the mold assembly, in practice certain problems are encountered which render such an approach inappropriate.

Where a sole mold assembly is provided with a bottom mold member not having a cavity portion for molding a heel, the clearance between the footform on which an upper is lasted and the bottom mold member is relatively small. The lasting of the upper onto the footform produces an upper marginal portion which is overlasted about the heel portion of the footform and which is characterized by upper material doubled over and "wrinkled" so that the marginal portion of the upper in the heel area protrudes from the cavity surface of the footform a distance substantially greater than merely the thickness of the upper material. Where there is relatively little clearance between the footform and the bottom mold member these folds or wrinkles tend to reach out from the footform to a point where they engage the bottom mold member, resulting in a molded sole having parts of the upper protruding therethrough, a readily recognizable undesirable sole.

SUMMARY OF THE INVENTION

An object of the present invention is to provide a sole mold assembly for the injection molding of heelless soles onto lasted uppers, the soles being adapted to subsequently receive heels of various styles.

A further object of the present invention is to provide such a mold assembly in which the bottom mold member is provided with means for urging the lasted upper against the footform whereby to maintain clearance between the upper and the bottom mold member for the molding of a sole portion therebetween, the sole portion being adapted to subsequently receive a heel of a selected style.

With the above and other objects in view, as will hereinafter appear, a feature of the present invention is the provision of a mold assembly for molding a sole onto a lasted upper, the mold assembly comprising a bottom mold member, side mold means, and top mold means comprising a footform for mounting a lasted upper, the footform being movable into position for engagement of the upper with the side mold means for closing the mold cavity, upper engaging means disposed on the mold cavity surface of the bottom mold member and protruding therefrom to engage the upper to urge the upper close against the mold cavity surface of the footform, whereby to maintain clearance between the overlasted marginal portion of the upper and the mold cavity surface of the bottom mold member, and means for introducing molten material to the sole mold cavity.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which there is shown an illustrative embodiment of the invention from which its novel features and advantages will be apparent.

FIG. 1 is a partially elevational, partially sectional, view of one form of mold assembly illustrative of an embodiment of the invention;

FIG. 2 is a bottom view taken along line II—II of FIG. 1;

FIG. 3 is a perspective view of a completed shoe, the sole portion of which is formed by the mold assembly shown in FIG. 1.

DESCRIPTION OF THE PREFERRED EMBODIMENT

Referring to FIG. 1, it will be seen that the illustrative mold assembly includes a bottom mold member 2 for forming the tread surface of a molded sole, side mold means 4 for forming the edge surfaces of a molded sole, and top mold means 6. The side mold means is engageable with the bottom mold members to form a sole mold cavity 10. The top mold means 6 may comprise, as shown, a footform 8 for mounting a lasted upper u, the footform 8 being movable into position for engagement of the upper u with the side mold means 4 to close the mold cavity 10. One of the mold members (bottom mold member 2 as shown in FIG. 1) is provided with a sprue passage 12 which is adapted to interconnect the mold cavity 10 and a source of molding material not shown but which may, for example, be of the sort described in U.S. Pat. No. 3,259,944, issued July 12, 1966, upon application of Donald B. McIlvin.

The bottom mold member 2 is provided with upper-engaging means 14 which extend from the heel portion of the bottom mold member. The upper-engaging means 14 may comprise pins 16 fixed in bores 18 in the bottom mold member. The pins protrude from the mold cavity surface of the bottom mold member a distance sufficient to permit free ends 20 of the pins 16 to engage the overlasted portion of the upper u mounted on the footform 8 to urge the upper close against the mold cavity surface of the footform, thereby to permit molding of a relatively thin sole portion in the area of the heel (FIGS. 1 and 2).

In operation, the mold means 2, 4, 6 are mounted for relative movement toward each other to close the sole mold cavity 10. The mold means may, for example, be mounted on a machine of the type disclosed in U.S. Pat. No. 3,358,333, issued Dec. 19, 1967, upon application of Charles J. Kitchener et al.

After closing of the mold cavity, the sprue passage 12 is connected to a molding material source of the type above referred to and molding material is introduced by way of the passage 12 into the cavity 10 to fill the cavity.

Upon filling of the mold cavity, a shut-off device, not shown, operates to terminate flow of molding material. The shut-off device may, for example, be of the type described in U.S. Pat. No. 3,299,476, issued Jan. 24, 1967, upon application of Donald B. McIlvin.

After elapse of sufficient cooling time, the mold assembly is opened and the upper u removed, there being a sole S molded onto the upper. The molded sole is characterized by a thin heel portion h which may subsequently receive a heel H (FIG. 3). Holes 22 are left in the molded sole, the holes having been formed by the flow of molding material around the pins 16. However, attachment of the heel H removes the holes 22 from view so that the holes do not detract from the appearance of the final product.

Since certain obvious changes may be made in the illustrated device without departing from the scope of the invention, it is intended that all matters contained herein be interpreted in an illustrative and not a limiting sense.

Having thus described my invention, what I claim as new and desire to secure by Letters Patent of the United States is:

1. Mold assembly for molding a sole onto a lasted upper, the mold assembly comprising a bottom mold member for forming the tread surface of the molded sole, side mold means for forming edge surfaces of the molded sole, said side mold means being engageable with said bottom mold member for forming a sole mold cavity, top mold means comprising a foot-form for mounting a lasted upper thereon and movable into position for engagement of the upper with said side mold means for closing said mold cavity, upper-engaging means disposed on the mold cavity surface of the bottom mold member and protruding therefrom to urge said upper close against the mold cavity surface of said footform, and means for introducing molding material to said sole mold cavity.

2. The invention according to claim 1 in which said upper-engaging means comprises pin means.

3. The invention according to claim 2 in which said pin means comprises a plurality of pins having free ends engageable with said upper.

4. The invention according to claim 3 in which said pins are disposed on and protrude from the heel portion of the mold cavity surface of the bottom mold member whereby to engage the heel portion of the upper.

References Cited

UNITED STATES PATENTS

| | | |
|---|---|---|
| 1,673,505 | 6/1928 | Haase. |
| 2,203,543 | 6/1940 | Pancorbo. |
| 2,878,523 | 3/1959 | Hardy _____ 18—175 X |
| 2,985,920 | 5/1961 | Borroff et al. |
| 3,109,701 | 5/1963 | Jacquet _____ 18—345 X |
| 3,315,317 | 4/1967 | Winkler. |

J. HOWARD FLINT, Jr., Primary Examiner

U.S. Cl. X.R.

18—17